Jan. 30, 1968   M. ALLEN   3,366,564

ELECTROHYDRAULIC PROCESS

Filed Feb. 2, 1965

Inventor:
Merton Allen,
by Paul G. Frank
His Attorney.

United States Patent Office 3,366,564
Patented Jan. 30, 1968

3,366,564
ELECTROHYDRAULIC PROCESS
Merton Allen, Schenectady, N.Y., assignor to General
Electric Company, a corporation of New York
Filed Feb. 2, 1965, Ser. No. 429,830
8 Claims. (Cl. 204—186)

ABSTRACT OF THE DISCLOSURE

In the killing of microorganisms by electrohydraulically generated shock waves, it has been found that higher rates of killing may be achieved at voltages less than about 10 kilovolts, which rate increases as the voltage is reduced to about 3 kilovolts.

Figure 1:
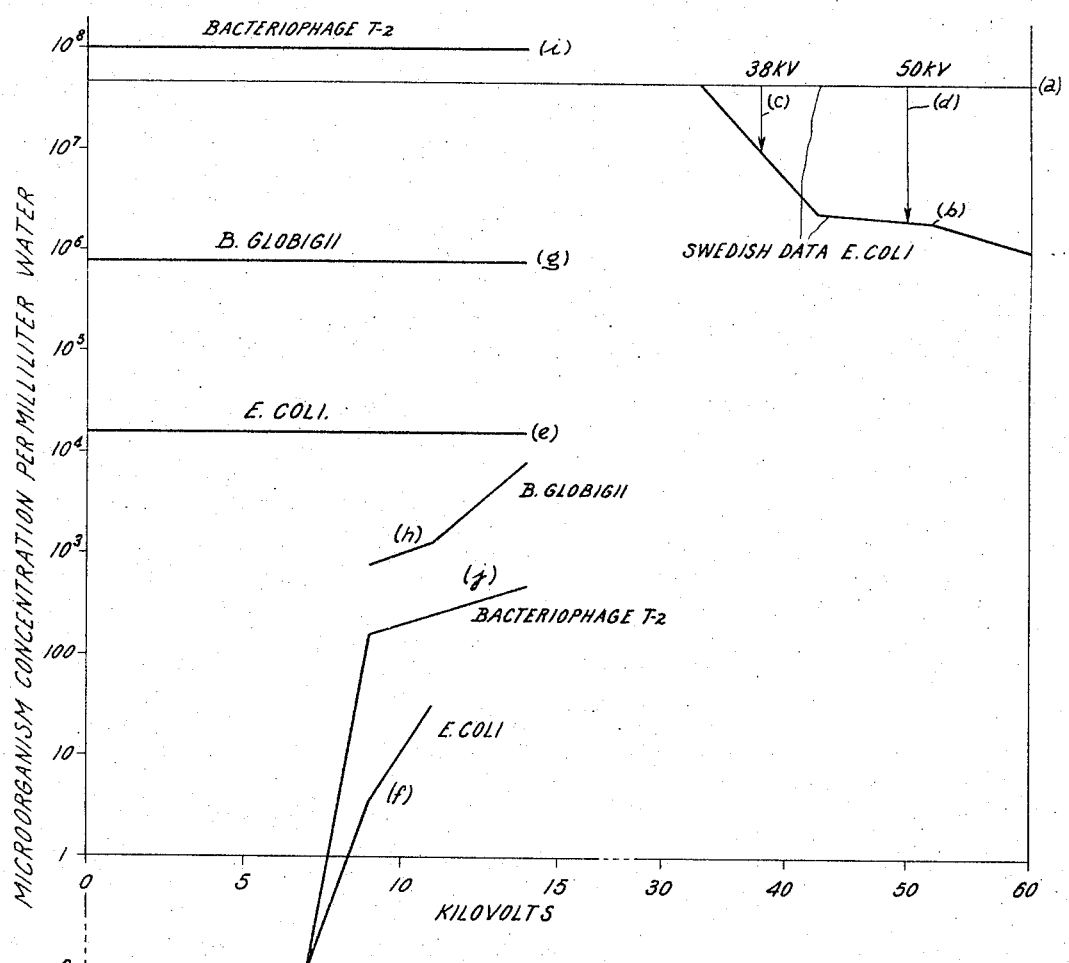

My invention relates to an electrohydraulic process for destroying (killing) microorganisms in a fluid medium, and in particular, to a process wherein the number or degree of microorganism destruction is greater at lower voltage than at higher voltage, destruction occurring in an inverse relationship with the magnitude of voltage employed in the electrohydraulic action. Attention is drawn to my copending application, S.N. 429,817, filed on Feb. 2, 1965, entitled, "Electrohydraulic Process," and assigned to the assignee of the present application wherein a process is disclosed for the production of vaccines utilizing the electrohydraulic process.

A recently developed concept, conveniently named "electrohydraulics," is known to have the ability of killing many strains of microorganisms which are known to cause pollution of water sources and are also present in other fluids such as untreated and partially treated sewage and the like. The electrohydraulic concept comprises a controlled release of stored electric energy into a relatively noncompressible and dielectric fluid medium which comprises the material to be purified. The controlled release of this stored energy in the fluid medium generates a controlled steep pressure or shock wave therein of sufficient intensity and a multitude of chemically active species to cause destruction (kill) of the microorganisms and thereby accomplish the purification process. The intensity and steepness of the pressure or shock wave which accomplishes much of the useful work in the fluid medium may be controlled by controlling the magnitude and other parameters of the stored electric energy or its manner of transmission into the fluid medium. The only known application of the electrohydraulic concept for causing destruction of microorganisms in a fluid medium is described in a Swedish paper entitled, "The Effect of Submerged Electrical Discharges on Bacteria," B. Brandt, L. Edebo, C. G. Hedin, B. Hjortzberg-Nordlund, I Selin and M. Tigerschold, published in May 1962 in the Swedish magazine, Teknisk-Vetenskaplig Forsking, the particular paper being identified as TVF 33(1962):5. The known application, however, was performed with electrohydraulic equipment comprising a relatively small capacitor for obtaining the stored electric energy, and the energy so stored was obtained at relatively high voltage. Further, the Swedish paper also claims an increased destruction of microorganisms as the voltage was increased and no destruction when voltage was decreased to 32 kilovolts. The known application of the electrohydraulic concept for producing destruction of microorganisms has, among other limitations, the disadvantage of operation in a range of relatively high voltage which requires more complex equipment with the attendant higher equipment and operating costs.

Therefore, one of the principal objects of my invention is to provide an improved process for causing destruction of microorganisms in a fluid medium by employing the electrohydraulic concept.

Another object of my invention is to provide such process wherein the electrohydraulic action is obtained in a range of relatively low voltage.

A still further object of my invention is to provide such process wherein an inverse relationship of microorganism destruction versus voltage is obtained.

Briefly stated, and in accordance with my invention, my process for destroying (killing) microorganisms in a fluid medium, employs the electrohydraulic concept operable within a range of values of relatively low voltage. The fluid containing the microorganisms is passed into an electrohydraulic chamber in which the unpurified fluid is confined for the duration of the purification process. A relatively large capacitor, or bank of multiple capacitors (greater than 5 microfarads) is thence charged to a desired level of electric energy from an electrical power supply operable within the low voltage range (3 to 14 kilovolts). An electrohydraulic shock comprising a relatively accurately predictable sudden intense pressure or shock wave within the fluid contained in the electrohydraulic chamber is thence initiated by discharging the electric energy stored in the capacitor into a spark gap immersed within the fluid. The capacitor may be recharged and redischarged any number of times to initiate a predetermined plurality of electrohydraulic shocks in the fluid whereby a desired degree of destruction of the microorganisms is obtained and the fluid thereby becomes purified. The purified fluid is thence passed from the electrohydraulic chamber for utilization thereof. Operation of the electrohydraulic equipment in the relatively low voltage range of 3 to 14 kilovolts produces an inverse relationship of microorganism destruction versus voltage such that increased microorganisms destruction is obtained with decreased voltage.

Figure 2:
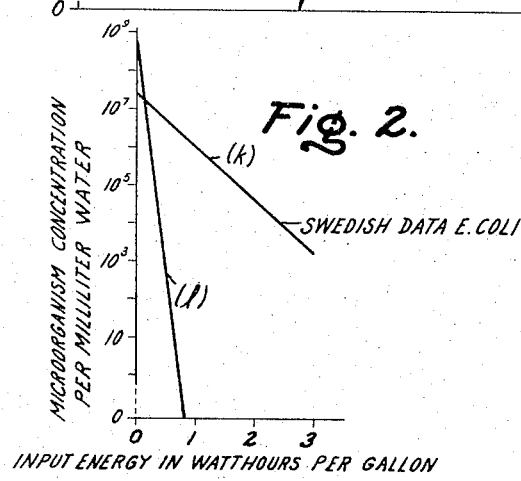

The features of my invention which I desire to protect herein are pointed out with particularity in the appended claims. The invention itself, however, both as to its organization and method of operation, together with further objects and advantages thereof, may best be understood by reference to the following description taken in connection with the accompanying drawings wherein;

FIGURE 1 is a graphical representation illustrating the resultant destruction of microorganisms versus voltage with the electrohydraulic process in accordance with my invention as compared to the known Swedish process; and FIGURE 2 is a graphical representation illustrating the efficiency of the process in accordance with my invention as compared to the Swedish process wherein the efficiency is in terms of the microorganism destruction vesus input electric energy.

The electrohydraulic concept is derived from the sudden release of a relatively large magnitude of electric energy within a relatively noncompressible fluid dielectric (but not absolutely nonconductive) medium. The electric energy is, in general, obtained from a conventional electrical power supply adapted to supply direct current power at a voltage in the kilovolt range. The electric energy is initially stored in a capacitor which is charged from the power supply. The electric energy stored in the capacitor is subsequently discharged into a spark gap immersed in the fluid which is confined in a container described as an electrohydraulic chamber. The discharge is produced in a series electrical circuit which includes the capacitor, a switching means for completing the circuit, the spark gap and suitable electrical conductors for transmitting the discharged energy to obtain desired characteristics of the steep pressure or shock wave generated in the fluid upon release of the electric energy across the spark gap. The shock wave may be of sufficient intensity, and a multitude of chemically active species are also formed, to cause destruction (kill) of many strains of microorganisms in the fluid. Microorganisms as described herein are of the type such as bacteria, virus, rickettsiae, fungi, and protozoa.

While the exact mechanism of electrohydraulic energy conversion and microorganism destruction is a complex phenomenon not fully understood at present, the following explanation of the operative principles involved is offered to explain such phenomenon. Delivery of the high voltage electric energy to the spark gap is at a faster rate than the fluid medium's ability to absorb the heat generated thereby. Consequently, the fluid medium is vaporized in the gap vicinity undergoing at least partial ionization. Subsequent expansion of plasma bubbles during the short time interval of energy release produces a shock wave in the remaining noncompressible fluid environment.

In the particular case wherein unpurified water is the fluid medium, the destruction of the bacteria and other microorganisms is attributed primarily to the chemically active species formed, the ultraviolet energy release, the high localized temperature, the intense pressure or shock wave generated within the water and the extreme turbulence created thereby, and phase changes caused by this intense pressure or shock wave. The chemically active species formed by the arc discharge appear to play a significant role in purifying the water as does the shock wave. The active species formed may be described as the decomposition products of the liquid media, for instance in water, hydrogen and the hydroxyl radicals and also nascent hydrogen and oxygen, hydrogen peroxide and ozone. The phase changes occurring due to the shock wave are the change from the water liquid to a gas or vapor phase or even to a solid ice phase at such high pressures for an instant of time. The values of the energy controlling parameters, such as voltage, capacitance, resistance and inductance, and certain design parameters such as electrode gap, liquid volume, and liquid physical and chemical properties can be varied according to the particular application and end effect desired. Although the interrelation between parameters is complex, and at present not fully understood, there are apparent optimum conditions for each particular microorganism and liquid media which results in effective purification. The energy for purification can range from as low as a fraction of a kwh. to as high as several hundred kwh. per 1000 gallons of media to be purified.

The aforementioned Swedish paper describes in detail the destruction of *E. coli* bacteria obtained by an electrohydraulic process. The Swedish work was performed with an electrohydraulic apparatus comprising an energy storage capacitor of 0.6 microfarad. The inductance of the energy discharge circuit was 214 microhenries and the electrode gap was 9.1 millimeters. The Swedish data, as illustrated in FIGURE 1 of my drawings presents a relationship of microorganism destruction versus voltage showing an increased destruction as the voltage is increased. The Swedish work was conducted with an initial concentration of *E. coli* of $6.5 \times 10^7$ per milliliter of water. The difference between the horizontal (initial concentration) line *a* and resultant decreasing concentration with increasing voltage line *b* represents the number of *E. coli* destroyed by the electrohydraulic process in accordance with the Swedish work. It can be seen that no destruction or kill of the *E. coli* bacteria was obtained until a discharge voltage greater than 32 kilovolts (kv.) was employed and thereafter the degree of destruction of *E. coli* (indicated by vertical arrows *c* and *d* at voltages 38 kv. and 50 kv., respectively, for purposes of illustration) increases as the discharge voltage is increased in the range of relatively high voltages (30 kv. to 60 kv.) employed in the Swedish work. The Swedish paper specifies that increased bacterial deaths are obtained with increased discharge voltage. The Swedish paper also claims that a discharge circuit inductance of 176 microhenries is optimum for maximum destruction of microorganisms and that both lower and higher inductance provides less satisfactory destruction, inductances as high as 960 microhenries having been employed. Finally, the Swedish paper claims that an increase in electrode separation (spark gap) enhances bacterial deaths.

The electrohydraulic process for destroying microorganisms in accordance with my invention is performed at voltages subtsantially lower in magnitude than the voltages employed in the Swedish work. In particular, I utilize the voltage range 3 kv. to 14 kv. To obtain the necessary amount of stored electric energy within the capacitor, I employ a substantially larger capacitance than in the Swedish work and have found that a capacitor bank having a total capacitance greater than 5 microfarads provides satisfactory results. The discharge circuit for the capacitor bank is of minimum inductance in the order of 2.5 microhenries. The low inductance is obtained by employing an electrical conductor network for connecting the capacitor bank and a 3-electrode rectifier (the switching means for completing the electrical discharge circuit) in series circuit relationship with the spark gap immersed within the fluid contained within the electrohydraulic chamber. The aforementioned conductor network comprises a shielded coaxial power capable of a flexible type and a plurality of parallel connected sections of such cable are employed. The cable is of a construction having a minimum inductance and also a low surge impedance. The electrical conductors which interconnect the normally parallel capacitors in the capacitor bank and the electrical conductors which connect the capacitor bank to the 3-electrode rectifier and the shielded portion of the cable preferably comprise electrical buss network. The use of such buss work and the characteristics of the cable provide an electrical circuit having minimum inductance commensurate with the maximum voltage employed in order to develop an electric energy discharge and thus provide a pulse of energy having a relatively steep wave front. Because of the lower voltage range, I also employ a subtsantially smaller spark gap than that employed in the Swedish work, preferably utilizing a gap in the range of 1.6 to 6.4 millimeters.

In FIGURE 1 the result showing destruction of *E. coli* bacteria in accordance with my invention are illustrated by initial concentration ($1.8 \times 10^4$ per milliliter water) line *e* and the resultant decreasing concentration with decreasing voltage line *f*. A capacitor bank of 45 microfarads was employed for the *E. coli* destruction data. A second example of the microorganism destruction attained in accordance with the process of my invention is illustrated by initial concentration line *g* and resultant line *h* which are for *B. globigii* spores. A capacitor bank of 27 microfarads was employed for the *B. globigii* spore destruction. Finally, a third example is illustrated by initial concentration line *i* and resultant line *j* which are for Bacteriophage T-2, the capacitor bank being 9 microfarads. In each of my examples, I employed a 6.3-millimeter spark gap and a volume of fluid of 1.2 liters. The spark gap is that obtained from a spark discharge electrode having preferably a coaxial configuration. In each of my examples I pass the unpurified fluid (containing a known quantity of a selected microorganism) into an electrohydraulic chamber in which the fluid is confined for the duration of the purification process. The relatively large capacitance (greater than 5 microfarads) is thence charged to a desired level of electric energy from a conventional direct current electrical power supply operable within the low voltage range of 3 kv. to 14 kv. At least one electrohydraulic shock, and, in general, a predetermined plurality of electrohydraulic shocks, one shock for each charging of the capacitance, are initiated by controlling the conduction point of the 3-electrode rectifier which acts as a switching device for completing the electrical discharge circuit. The conduction of the 3-electrode rectifier causes a delivery of the electric energy, previously stored in the capacitance, to the spark gap immersed in the fluid, and the resultant electrohydraulic shock whereby a number (or all) of the microorganisms are destroyed and the fluid thereby becomes purified. Each of the concentration-voltage points for a particular microorganism on the graph of FIGURE 1 is determined by employing substantially the same total input electric energy level at each concentration-voltage point. Thus, a greater number of electrohydraulic shocks are used as the voltage is decreased to thereby keep total input energy constant and have voltage as the only variable. Obviously, the same initial concentration of microorganisms is utilized at each concentration voltage point for that particular microorganism. After the fluid is purified by the electrohydraulic shocks to a desired degree of purification or sterilization (microorganism destruction), the purified fluid is passed from the electrohydraulic chamber for utilization thereof.

It can be appreciated from FIGURE 1 that in each of my examples, increased destruction or kill of the microorganism is obtained as the discharge voltage is decreased within the voltage range of 3 kv. to 14 kv. In contradistinction, the Swedish work at the higher voltages obtains increased destruction with increased voltage. Further, my process obtains greater kill as indicated by the greater differences between the initial concentration and resultant concentration lines, as well as by the fact that I destroy all of the microorganisms (*E. coli* and Bacteriophage T-2 for illustration) whereas the Swedish work does not indicate total kill within their voltage range of 32 kv. to 60 kv.

In FIGURE 2, I have plotted microorganism (*E. coli*) concentration per milliliter water versus input electric energy in watthours per gallon water to indicate the relative efficiencies of my process versus the Swedish process. The Swedish data, line *k*, was not available for total kill as was my data, line *l*, but the plots clearly indicate that my process obtains a greater destruction or kill for a smaller input energy and therefore is significantly more efficient than the Swedish process.

I have also used the electrohydraulic process above-described, and in the same low voltage range, to simultaneously destroy microorganisms such as *E. coli*, substantially reduce B.O.D. (biological oxygen demand) and reduce the suspended solids content in a slurry such as untreated sewage. The electric energy requirements for sewage treatment depend upon the suspended solids content and range from less than 5 watthours per gallon to several 100 watthours per gallon. In a particular sewage treatment test I employed a capacitor bank of 18 microfarads, a voltage of 5 kilovolts, and the untreated sewage contained 132,000 living organisms per milliliter sewage of which 50,000 were *E. coli*. After a total input electric energy of 5 watthours per gallon, there were only 5400 living organisms remaining of which 15 were *E. coli*. After a total input of 10 watthours per gallon, there were only 680 living organisms remaining of which 5 were *E. coli*. Finally, after a total input of 15 watthours per gallon, there were only 170 living organisms remaining and all the *E. coli* were killed. Thus, my process finds utility for both purifying water and sewage.

Once the optimum electrohydraulic apparatus parameters such as volume of fluid, level of electric energy per electrohydraulic shock, number of electrohydraulic shocks, charging (discharge) voltage, spark gap and capacitor size have been determined by test for each microorganism of interest, my process may also be employed to destroy mixtures of several types of known microorganisms. Thus, in untreated or partially treated sewage I can destroy any number, or all, of each of several types of microorganisms that may collectively be present therein. The destruction of several types of microorganisms may be accomplished by either of the following two processes: (1) the electrohydraulic apparatus parameters are generally predetermined for the desired degree of sterilization (total kill or kill of a certain percentage) of the most difficult to kill microorganism present, and the associated highest total input electric energy level is employed in one or more electrohydraulic discharges (shocks) at constant energy per discharge (shock). In this manner the more easily killed microorganisms are also destroyed. The total input electric energy is also a function of the type of microorganism and the concentration thereof. Therefore, by this first process, in the event there are only a few of the most difficult to kill microorganisms present, and a great quantity of more easily killed microorganisms, the total input energy may be greater since more electrohydraulic shocks at the same initial energy level per shock will be required to obtain the desired kill of all microorganisms present; (2) a more economically advantageous process is to reduce the energy per shock to kill the residual microorganisms. Thus, a relatively high input electric energy level per shock is employed to kill the most difficult to kill microorganism to the desired degree. The residual, or more easily killed microorganisms remaining may then be killed to their desired degree by employing a lower input electric energy level per shock. The minimum effective energy level per shock appears to be approximately 50 joules per shock.

A single electrohydraulic discharge may be sufficient to obtain the desired kill provided the fluid volume is sufficiently small and there are a relatively small number of microorganisms present. The electrohydraulic process may be performed in a continuous or batch type operation, the continuous type preferably employing a multiple electrode structure.

The fluids which may be treated by my process are, in general, any liquid which is a dielectric medium, but not absolutely nonconductive, and which consists of a pure liquid, mixtures of liquids (both miscible and immiscible), liquids containing dissolved solids and/or gases, liquids containing suspended solids (slurry); and, in addition, the surface of solids in contact with the fluids are also purified.

From the foregoing description, it can be appreciated that my invention makes available an improved electrohydraulic process for destroying microorganisms in a fluid medium wherein the electrohydraulic action is obtained in a relatively low voltage range and an inverse relationship of microorganism destruction versus voltage is evident. My discovery that a low voltage range substantially lower in voltage magnitude than the higher voltage range previously employed permits the use of much simpler electrohydraulic equipment since the electrical insulation problem is minimized and thus a more economical process for destroying microorganisms in a fluid is obtained.

Having described my electrohydraulic process for the destruction of microorganisms in a fluid medium, it is believed obvious that modification and variation of my invention is possible in the light of the above teachings. Thus, my process is not limited to these microorganisms disclosed but is applicable to all microorganisms described as bacteria, virus, rickettsiae, fungi and protozoa. Also, my process is not limited to simple fluid systems but may be employed in a two-fluid or multi-fluid system containing a diaphragm means such as an electrohydraulic chamber divider, dividing the chamber into two or more parts, thus separating the fluid into which the electrohydraulic energy is discharged, from the fluid or fluids being purified; or a container such as a plastic bottle or metal can in which the fluid to be purified is contained and which is immersed in the fluid being electrohydraulically shocked. The multi-fluid system may also consist of layers of immiscible fluids, separated one from the other only by the natural interface, in which the electrohydraulic shocks are discharged into one layer only. It is, therefore, to be understood that changes may be made in the particular process as described which are within the full intended scope of the invention as defined by the following claims.

What I claim as new and desire to secure by Letters Patent of the United States is:

1. A process for destroying microorganisms in an aqueous liquid medium comprising the steps of
   passing an unpurified fluid into an electrohydraulic chamber in which the fluid in confined for the duration of the purification process,
   charging a capacitance to a desired level of electric energy capable of delivering a shock wave to said aqueous medium having a minimum effective energy level of about 50 joules per shock,
   initiating at least one electrohydraulic shock at a voltage relatively low within the fluid contained in the electrohydraulic chamber by discharging the capacitance whereby microorganisms within the fluid are destroyed and the fluid thereby becomes purified, and
   passing the purified fluid from the electrohydraulic chamber for utilization thereof.

2. A process for destroying microorganisms in an aqueous liquid medium such as water, sewage and the like comprising the steps of
   passing an unpurified fluid into an electrohydraulic chamber in which the fluid is confined for the duration of the purification process,
   charging a relatively large capacitance having a value of capacitance greater than 5 microfarads to a desired level of electric energy capable of delivering a shock wave to said aqueous medium having a minimum effective energy level of about 50 joules per shock,
   initiating a predetermined plurality of electrohydraulic shocks at a voltage relatively low within the fluid contained in the electrohydraulic chamber by discharging the electric energy stored in the capacitance into a spark gap immersed within the fluid whereby microorganisms within the fluid are destroyed to a desired degree and the fluid thereby becomes purified, and
   passing the purified fluid from the electrohydraulic chamber for utilization thereof.

3. A process for destroying microorganisms in an aqueous liquid medium such as water, sewage and the like comprising the steps of
   passing an unpurified fluid into an electrohydraulic chamber in which the fluid is confined for the duration of the purification process,
   charging a capacitance to a desired level of electric energy capable of delivering a shock wave to said aqueous medium having a minimum effective energy level of about 50 joules per shock,
   initiating at least one electrohydraulic shock at a voltage within the range of 3 to 14 kilovolts within the fluid contained in the electrohydraulic chamber by discharging the capacitance whereby microorganisms in the fluid are destroyed to a desired degree and the fluid thereby becomes purified, and
   passing the purified fluid from the electrohydraulic chamber for utilization thereof.

4. A process for destroying microorganisms in an aqueous liquid medium such as water, sewage and the like comprising the steps of
   passing an unpurified fluid into an electrohydraulic chamber in which the fluid is confined for the duration of the purification process,
   charging a relatively large capacitance having a value of capacitance greater than 5 microfarads to a desired level of electric energy from an electrical power supply capable of delivering a shock wave to said aqueous medium having a minimum effective energy level of about 50 joules per shock,
   initiating a predetermined plurality of electrohydraulic shocks at a voltage within the range of 3 to 14 kilovolts within the fluid contained in the electrohydraulic chamber by discharging the electric energy stored in the capacitance into a spark gap immersed within the fluid whereby microorganisms in the fluid are destroyed to a desired degree and the fluid thereby becomes purified, and
   passing the purified fluid from the electrohydraulic chamber for utilization thereof.

5. An electrohydraulic process for obtaining an inverse relationship of microorganism destruction versus discharge voltage comprising the steps of
   passing an aqueous liquid containing microorganisms into an electrohydraulic chamber in which the unpurified fluid is confined for the duration of the purification process,
   charging a relatively large capacitance having a capacitance value greater than 5 microfarads to a desired level of electric energy from an electrical power supply capable of delivering a shock wave to said aqueous medium having a minimum effective energy level of about 50 joules per shock,
   initiating a predetermined plurality of electrohydraulic shocks, one shock for each charging of the capacitance, at a discharge voltage within the range of 3 to 14 kilovolts within the fluid contained in the electrohydraulic chamber by discharging the electric energy stored in the capacitance into a spark gap immersed within the fluid for producing an inverse relationship of microorganism destruction versus discharge voltage, and
   passing the purified fluid from the electrohydraulic chamber for utilization thereof.

6. A process for destroying a plurality of several types of microorganisms in a fluid medium comprising the steps of
   passing an aqueous liquid containing a plurality of several types of microorganisms into an electrohydraulic chamber in which the fluid is confined for the duration of the purification process,
   charging a relatively large capacitance to a first desired level of electric energy from an electrical power supply operable at a first voltage within the range of 3 to 14 kilovolts,
   initiating a first predetermined plurality of electrohydaulic shocks, one shock for each charging of the capacitance, at the first voltage within the fluid contained in the electrohydraulic chamber by discharging the electric energy stored in the capacitance into a spark gap immersed within the fluid whereby a first type of the microorganisms are destroyed to a desired degree,
   recharging the capacitance to a second desired level of electric energy from the power supply operable at a second voltage within the range of 3 to 14 kilovolts,
   initiating a second predetermined plurality of electrohydraulic shocks, one shock for each recharging of the capacitance, at the second voltage whereby the residual types of microorganisms are destroyed to a desired degree, all of said shocks having a minimum effective energy level of at least 50 joules per shock, and
   passing the purified fluid from the electrohydraulic chamber for utilization thereof.

7. The process as recited in claim 6 wherein the first level of electric energy and the second level of electric energy are equal by having the first voltage equal to the second voltage.

8. The process as recited in claim 6 wherein the first and second levels of electric energy are unequal.

References Cited

UNITED STATES PATENTS

| | | |
|---|---|---|
| 2,955,076 | 10/1960 | Gossling _____ 204—131 |
| 672,231 | 4/1901 | Lecomme. |
| 696,647 | 4/1902 | Lacomme. |
| 2,931,947 | 4/1960 | Fruengel. |

FOREIGN PATENTS

| | | |
|---|---|---|
| 620,856 | 5/1961 | Canada. |
| 845,743 | 8/1960 | Great Britain. |

HOWARD S. WILLIAMS, *Primary Examiner.*

JOHN H. MACK, *Examiner.*

T. TUFARIELLO, *Assistant Examiner.*